United States Patent [19]

Tone et al.

[11] Patent Number: 5,336,725

[45] Date of Patent: Aug. 9, 1994

[54] METHOD FOR PREPARING GRAFT COPOLYMER

[75] Inventors: Seiji Tone; Akira Nakata; Naoki Yamamoto, all of Hiroshima, Japan

[73] Assignee: Mitsubishi Rayon Co., Ltd., Tokyo, Japan

[21] Appl. No.: 901,210

[22] Filed: Jun. 19, 1992

[30] Foreign Application Priority Data

Jun. 21, 1991 [JP] Japan .................. 3-150424

[51] Int. Cl.$^5$ .............. C08F 265/06; C08F 220/18
[52] U.S. Cl. .................. 525/254; 525/259; 525/261; 525/273; 525/309; 525/244; 525/249; 526/185; 526/194; 526/217; 526/225
[58] Field of Search ............... 525/244, 249, 259, 261, 525/309, 254, 273; 526/185, 194, 217, 225

[56] References Cited

U.S. PATENT DOCUMENTS 4,940,760  7/1990  Boettcher et al.
5,126,882  6/1992  Makoto et al.

FOREIGN PATENT DOCUMENTS

| | | |
|---|---|---|
| 59-33077 | 2/1984 | Japan . |
| 61-171001 | 10/1986 | Japan . |
| 1-107406 | 4/1989 | Japan . |
| 1-244490 | 9/1989 | Japan . |
| 1-245220 | 9/1989 | Japan . |
| 1-252933 | 10/1989 | Japan . |
| 2-17 | 1/1990 | Japan . |
| 2-84618 | 3/1990 | Japan . |
| 2-176629 | 7/1990 | Japan . |
| WO88/06603 | 9/1988 | World Int. Prop. O. . |

OTHER PUBLICATIONS

Odian, G. "Principles of Polymerization". N.Y. John Wiley & Sons, Inc., 1991, pp. 407–408.

Primary Examiner—Vasu S. Jagannathan
Attorney, Agent, or Firm—Oblon, Spivak, McClelland, Maier & Neustadt

[57] ABSTRACT

A method for preparing a graft copolymer is here disclosed which is characterized by comprising the step of carrying out a living polymerization of at least one (meth)acrylic ester by the use of a polymeric compound as an initiator having one or more units represented by the following formula (I) in a molecular chain substantially in the absence of water in the presence of a Lewis acid or a donor compound of an anion selected from the group consisting of $HF_2^-$, $(CH_3)_3SiF_2^-$ and $F^-$:

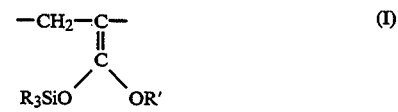

(I)

wherein R is hydrogen or an alkyl group having 1 to 6 carbon atoms, and R' is an alkyl group having 1 to 12 carbon atoms.

10 Claims, No Drawings

METHOD FOR PREPARING GRAFT COPOLYMER

BACKGROUND OF THE INVENTION

1. Field of the Invention

The present invention relates to a novel method for preparing a (meth)acrylic ester-based graft copolymer having a regulated molecular structure.

2. Description of the Prior Art

For the purpose of improving the function and performance of polymeric materials, block copolymers and graft copolymers have been heretofore developed. In recent years, the synthetic techniques of oligomers and polymers (macromonomers) each having a polymerizable functional group at the terminal thereof have been advanced, and much attention is paid to the development and application of the graft copolymers by the use of these techniques. As the synthetic techniques of the macromonomers, various methods have been suggested so far. For example, there have been a Milkovich et al's anion polymerization method (Japanese Patent Laid-open Nos. 21486/1972, 116586/1975 and the like), a radical polymerization method of ICI Ltd. (Japanese Patent Laid-open Nos. 11224/1968 and 16147/1968), a radical polymerization method of Du Pont (U.S. Pat. No. 3,689,593) and a GTP (group transfer polymerization) method of Toagosei Chemical Industry Co., Ltd. (Japanese Patent Laid-open No. 62801/1987). However, the above-mentioned anion polymerization method has the drawback that it is difficult to apply the same method to (meth)acrylic ester monomer. In the above-mentioned radical polymerization method, the obtained macromonomer contains bifunctional components attributed to a side reaction such as the termination of recombination, and when this method is used to manufacture the graft copolymer, a crosslinking reaction occurs and the obtained graft copolymer inconveniently has poor moldability. The above-mentioned GTP method is suitable for the synthesis of the macromonomer by the use of a (meth)acrylic ester and can provide the macromonomer having a high purity, and so it is more excellent than the other methods in these points. However, the synthetic reaction of an initiator which is used in the preparation of the macromonomer is a multi-stage reaction, so that yield is low (about 10 to 20%). In consequence, the GTP method is not considered to be a satisfactory industrial production method. Furthermore, in the case of the GTP method, the composition of the graft copolymer is often distributed in a certain range, depending upon a copolymerization reactivity ratio between the polymerizable vinyl group of the macromonomer and a comonomer, and it is not easy to obtain the graft copolymer having a regulated structure. Moreover, in the polymerization of the macromonomer and the comonomer, the solubility of the macromonomer in the comonomer is often low, and in a solution radical polymerization which is often used, there is the problem that it is difficult to increase the molecular weight of a backbone polymer. As understood from the foregoing, these conventional graft copolymer preparation methods using the macromonomer are not suitable for the formation of the graft copolymer having the regulated molecular structure in compliance with a molecular design.

On the other hand, the above-described GTP method has been proposed as a method for preparing methyacrylic resins or copolymer thereof by Du Pont in U.S. Pat. Nos. 4,414,372; 4,417,034; 4,508,880; 4,524,196 and the like. However, these patents disclose methods for preparing the above-described macromonomer or a block copolymer but do not disclose a method for preparing a graft copolymer.

SUMMARY OF THE INVENTION

An object of the present invention is to provide a novel method for preparing a (meth)acrylic ester-based graft copolymer in a high yield in which a polymeric compound constituting the backbone of the graft copolymer and a (meth)acrylic ester component constituting the branch portions thereof can be selected from a wide range, and the chain length of the backbone and branch portions are controlled.

The gist of the present invention resides in a method for preparing a graft copolymer which is characterized by comprising the step of carrying out a living polymerization of at least one (meth)acrylic ester by the use of a polymeric compound as an initiator having one or more units represented by the following formula (I) in a molecular chain substantially in the absence of water in the presence of a Lewis acid or a donor compound of an anion selected from the group consisting of $HF_2^-$, $(CH_3)_3SiF_2^-$ and $F^-$:

(I)

wherein R is hydrogen or an alkyl group having 1 to 6 carbon atoms, and R' is an alkyl group having 1 to 12 carbon atoms.

DETAILED DESCRIPTION OF THE PREFERRED EMBODIMENTS

No particular restriction is put on a polymeric compound (hereinafter referred to as "the polymeric initiator") which can be used as an initiator in the present invention, so long as the polymeric initiator has at least one unit represented by the formula (I) in its molecular chain. The polymeric initiator preferably has two or more units represented by the formula (I) in the molecular chain.

The polymeric initiator can be prepared by reacting a polymeric compound having one or more acrylic ester units in its molecular chain (hereinafter referred to as "the raw material of polymeric initiator") with a metallizing agent such as lithium diisopropylamide to subtract an α-proton from an acrylic ester moiety, and then reacting with a silanizing agent such as trimethylsilyl chloride, but the preparation of the polymeric initiator is not always limited to this process. Lithium diisopropylamide of the metallizing agent can be prepared, for example, by reacting n-butyl lithium with diisopropylamine at 0° C. Suitable examples of the silanizing agent include tri-n-butylsilyl chloride, t-butyldimethylsilyl chloride, hexamethyldisilazane, hexaethyldisilazane, hexa-iso-butyldisilazane and hexa-t-butyldisilazane, in addition to trimethylsilyl chloride. No particular restriction is put on the raw material of polymeric initiator, but its examples include a polyacrylic ester, methacrylic ester-acrylic ester copolymer and ethylene-acrylic ester copolymer. They can be suitably selected and used in compliance with a purpose.

Furthermore, no particular restriction is put on the molecular weight of the polymeric initiator, but preferably it is from 1,000 to 1,000,000 in terms of a number average molecular weight. When the number average molecular weight is less than 1,000, physical properties of the obtained graft copolymer tend to deteriorate, and conversely when it is more than 1,000,000, moldability is liable to deteriorate. For the preparation of the polymeric initiator material, a known optional polymerization technique and known polymerization conditions can be used. For example, if high molecular weight is required, an emulsion polymerization, suspension polymerization or mass polymerization can be used in addition to a usual solution radical polymerization. If it is necessary to control molecular weight and molecular weight distribution, a living polymerization such as an anion polymerization is employed, whereby the polymer structure of the polymeric initiator material constituting the backbone portion of the graft copolymer can be highly controlled.

R in the formula (I) is hydrogen or an alkyl group having 1 to 6 carbon atoms, but a methyl group is preferable, since its raw material is easily available. The alkyl groups having 7 or more carbon atoms can be also utilized, but they are not recommendable, since they are not easily available. R' is an alkyl group having 1 to 12 carbon atoms, but from the viewpoint of easy availability, the alkyl group having 1 to 4 carbon atoms is preferable. The alkyl groups having 13 or more carbon atoms can be also utilized, but they are not proper, since they are not easily available and have low reactivity.

As the (meth)acrylic ester for use in the living polymerization of the present invention, an optional one can be selected in compliance with a purpose. Examples of the (meth)acrylic ester include methyl (meth)acrylate, ethyl (meth)acrylate, n-butyl (meth)acrylate, octyl (meth)acrylate, dodecyl (meth) acrylate, 2-ethylhexyl (meth) acrylate, 2,2,2-trifluoroethyl (meth)acrylate, 2,2,3,3-tetrafluoropropyl (meth)acrylate, benzyl (meth)acrylate, phenyl (meth)acrylate, allyl (meth)acrylate, glycidyl (meth)acrylate and trimethylsilyl (meth)acrylate. In compliance with the object of the present invention, a polyfunctional (meth)acrylic ester having two or more $\alpha,\beta$-unsaturated vinyl groups can be also added to the (meth) acrylic ester.

In the present invention, the length of chains of the (meth)acrylic ester polymer which is the branch portions of the graft copolymer obtainable by the living polymerization can be controlled on the basis of a molar ratio of the (meth)acrylic ester monomer to the units represented by the formula (I) in the polymeric initiator. No particular restriction is put on this molar ratio, but it is preferably in the range of from 10 to 10,000. When the molar ratio is less than 10, physical properties tend to deteriorate, and when it is more than 10,000, moldability is liable to deteriorate.

A compound which can be used as the catalyst for use in the living polymerization of the present invention is preferably a Lewis acid in the case that the monomer for the polymerization is an acrylic ester, and it is preferably a donor compound of an anion selected from $HF_2^-$, $(CH_3)_3SiF_2^-$ and $F^-$ in the case that the monomer is the methacrylic ester. Examples of the Lewis acid include zinc halides such as $ZnCl_2$, $ZnBr_2$ and $ZnI_2$, and compounds such as mono- and dialkylaluminum halides and dialkylaluminum oxides. Above all, the zinc halides are preferable. The amount of the Lewis acid in the reaction system is preferably in the range of from 5 to 20 mol% based on the monomer to be fed to the living polymerization. Typical examples of the donor compound of an anion selected from $HF_2^-$, $(CH_3)_3SiF_2^-$ and $F^-$ include a trisdimethylaminosulfonium salt (hereinafter referred to as "a TAS salt") of $HF_2^-$ or $(CH_3)_3SiF_2^-$, i.e., $TAS^+HF_2^-$, $TAS^+(CH_3)_3SiF_2^-$; and tetrabutylammonium fluoride $[(C_4H_9)_4N^+F^-]$, and $TAS^+(CH_3)_3SiF_2^-$ is most preferable. The amount of the donor compound of an anion in the reaction system is preferably in the range of from about 0.1 to 50 mol% with respect to starting sites [the units represented by the formula (I)].

The polymerization reaction for synthesizing the graft copolymer in the present invention can be carried out in the absence of any solvent, but in general, it is preferably performed in a suitable solvent. In the case that the Lewis acid is used as the catalyst, examples of the suitable solvent include chlorinated hydrocarbon solvents such as dichloromethane and 1,2-dichloroethane, toluene, xylene and tetralin. A solvent which reacts with a Lewis acid such as tetrahydrofuran is improper. In the case that the donor compound of an anion is used as the catalyst, examples of the suitable solvent include tetrahydrofuran, toluene, xylene, tetralin and acetonitrile. Halogenated hydrocarbon solvents such as methylene chloride and chloroform are not preferable. Prior to the use, these solvents are required to be sufficiently dehydrated and purified in a usual manner. When the insufficiently dehydrated/purified solvent is used, the polymerization of the (meth)acrylic ester does not proceed in the form of the living polymerization, so that the desired graft copolymer cannot be obtained. The reaction is required to be carried out similarly in a sufficiently dehydrated/purified inert gas or in vacuo.

In the graft copolymer of the present invention, the (meth)acrylic ester polymer segments constituting the branch portions are synthesized by the living polymerization. Therefore, it is also possible to further treat these segments so that they may be composed of a block copolymer. For example, butyl methacrylate is first polymerized by the use of the polymeric initiator, and methyl methacrylate is then added thereto, followed by polymerization, to produce the graft copolymer in which the branch portions comprise a block copolymer consisting of polybutyl methacrylate and polymethyl methacrylate.

The synthesis of the graft copolymer in the present invention is carried out in the temperature range of from $-100°$ to $100°$ C. A more preferable temperature range is from $-80°$ to $60°$ C.

In the present invention, the graft copolymer can be controlled so as to have a desired molecular structure in compliance with a purpose and application. For example, in the case that high transparency and weather resistance are required, a poly(meth)acrylic ester is preferably used as the raw material of polymeric initiator. Alternatively, in the case that high impact strength, tensile strength and elongation at break are required, or in the case that properties of an elastomer are required, a rubbery polymeric compound typified by the polyacrylic ester having a glass transition temperature of $0°$ C. or less is selected as the raw material of polymeric initiator, and it is preferable to select such a polymer of (meth)acrylic ester having a glass transition temperature of $40°$ C. or more which constitute the branch portions of the graft copolymer obtained by the living polymerization. Thus, the present invention permits simply synthesizing the graft copolymer having an optionally regulated molecular structure.

Now, the present invention will be described in detail in reference to examples, but the scope of the present invention should not be limited to these examples.

various physical properties in the examples were evaluated by the following procedures. Modulus in tension, tensile strength at break and elongation at break were measured in accordance with ASTM D-638. Light transmittance was measured in accordance with ASTM D-1003 regarding to samples having a thickness of 3.2 mm.

Weathering properties were evaluated by measuring an elongation retention ratio of each sample after it was exposed to a sunshine weather-ometer for 1,000 hours. Dynstat impact strength was measured in accordance with DIN-53453. Furthermore, the amount (mol) of starting sites in each example was expressed on the basis of the assumption that one unit represented by the formula (I) was regarded as one molecule.

EXAMPLE 1

[Synthesis of poly-n-butyl acrylate (PBA)-based] polymeric initiator

One kg of butyl acrylate (BA), 1 kg of toluene and 1 g of benzoyl peroxide (BPO) were mixed and dissolved, and they were then reacted at 80° C. for 2 hours in a nitrogen gas atmosphere. The reaction solution was added dropwise to 15 l of methanol to precipitate a polymer. The obtained polymer was then vacuum-dried at 80° C. for 12 hours, thereby obtaining 890 g of PBA. The number average molecular weight of this polymer was measured by GPC (gel permeation chromatography), and as a result, it was 100,000. Yield was 89%.

Next, 440 g (BA: 3.4 mol) of this PBA were dissolved in 10 l of sufficiently dehydrated and purified tetrahydrofuran (THF), and the solution was then cooled to −75° C. with stirring in a dry argon gas atmosphere. Afterward, 16 ml (LDA: 34 mmol) of a lithium diisopropylamide (LDA) solution (27 wt%, a THF/heptane solution) were added dropwise thereto. After one hour, 10.3 ml (83 mmol) of trimethylsilyl chloride (TMSC) were added thereto, the solution was further reacted at 25° C. for 3 hours. THF which was a solvent was distilled off, and 10 l of dehydrated/dried diethyl ether were added thereto. A salt which was a by-product was removed from the solution by filtration, and diethyl ether was then distilled off to obtain 440 g of a polymeric initiator which was a product (yield 98%). The structure of the product was confirmed by NMR, and the number of starting sites in the polymeric initiator was 8 on the average per molecular chain. The glass transition temperature of the product was measured by DSC (differential scanning calorimeter), and as a result, it was −55° C.

[Living polymerization of methyl methacrylate (MMA)]

440 g of the resulting polymeric initiator (starting sites: 34 mmols) were dissolved in 2 l of THF, and 70 ml of an acetonitrile solution (0.18 mmol/ml) of TAS+(CH$_3$)$_3$SiF$_2$− were added thereto. Afterward, 700 ml (660 g, 6.6 mols) of methyl methacrylate were added thereto at and reaction was then carried out for 2 hours The solution was then added to methanol to precipitate, thereby obtaining 1050 g of a BA/MMA graft copolymer (backbone: PBA, branches: PMMA, PBA/P-MMA=40/60) which was an object product (yield 95%). The yield, total light transmittance, modulus in tension, tensile strength, elongation at break and weather resistance of the obtained graft copolymer are set forth in Table 1.

EXAMPLE 2

In the living polymerization of MMA by the use of a polymeric initiator obtained by the same procedure as in Example 1, 690 g (starting sites: 53 mmols) of the polymeric initiator were dissolved in 3 l of THF, and 110 ml of an acetonitrile solution (0.18 mmol/ml) of TAS+(CH$_3$)$_3$SiF$_2$− was further added thereto. Next, 490 ml (460 g, 4.6 tools) of MMA were added dropwise thereto at 0° C. and the solution was then reacted for 2 hours. The solution was added to methanol to cause precipitation, thereby obtaining 1090 g of BA/MMA graft copolymer (backbone: PBA, branches: PMMA, PBA/PMMA=60/40) which was a product (yield 95%). The yield, total light transmittance, modulus in tension, tensile strength, elongation at break and weather resistance of the obtained graft copolymer are set forth in Table 1.

EXAMPLE 3

[Synthesis of PMMA-based polymeric initiator]

991 g of MMA, 9 g of methyl acrylate (MA) and 2 g of BPO were dissolved in 1 kg of toluene, and the solution was then heated at 80° C. for 2 hours in a nitrogen gas atmosphere. Next, the reaction solution was added dropwise to 15 l of methanol to reprecipitate a polymer. The obtained polymer was then vacuum-dried at 80° C. for 12 hours to obtain 910 g of an MMA-MA copolymer. The number average molecular weight of this polymer was 90,000 according to GPC (yield 91%).

Next, 600 g of this MMA-MA copolymer (MA: 62 mmols) were dissolved in 10 l of sufficiently dehydrated/purified THF and then cooled to −75° C. with stirring in a dry argon gas atmosphere, and afterward 29 ml (LDA: 62 mmols) of an LDA solution (27 wt%, a THF/heptane solution) were added dropwise. After one hour, 19 ml (156 mmols) of TMSC were added, and the solution was then reacted at 25° C. for 3 hours. Next, THF which was a solvent was distilled off, and 10 l of dehydrated/dried diethyl ether were added thereto, and a salt which was a by-product was then removed therefrom by filtration. Then diethyl ether was distilled off to obtain 600 g of a polymeric initiator which was a product (yield 98%). The structure of the product was confirmed by NMR, and the number of starting sites in the polymeric initiator was 9 on the average per molecular chain. The glass transition temperature of the product was measured by DSC, and as a result, it was 106° C.

[Living polymerization of BA]

Next, 600 g (starting sites: 62 mmols) of this polymeric initiator were dissolved in 5 l of sufficiently dehydrated/purified 1,2-dichloroethane, and 40 g (300 mmols) of zinc chloride were placed therein and the temperature of a reaction system was set to 0° C. with stirring. Afterward, 400 g of BA (3.1 mols) were added thereto dropwise, and the solution was then reacted for 2 hours. The solution was added to methanol to cause precipitation, thereby obtaining 940 g of an MMA/BA graft copolymer (backbone: PMMA, branches: PBA, PMMA/PBA=60/40) which was a product (yield 94%). The yield, total light transmittance, modulus in tension, tensile strength, elongation at break and weather resistance of the obtained graft copolymer are set forth in Table 1.

EXAMPLE 4

[Synthesis of polyethyl acrylate (PEA)-based polymeric initiator]

1 kg of ethyl acrylate (EA), 1 kg of toluene and 1 g of BPO were mixed and dissolved, and the solution was then heated at 80° C. for 2 hours in a nitrogen gas atmosphere. Next, the reaction solution was added dropwise to 15 l of hexane to reprecipitate a polymer. The obtained polymer was then vacuum-dried at 80° C. for 12 hours to obtain 880 g of PEA. The number average molecular weight of this polymer was 80,000 according to GPC, and yield was 88%.

Next, 660 g of this PEA (MA: 6.6 tools) were dissolved in 10 l of sufficiently dehydrated/purified THF and then cooled to $-75°$ C. with stirring in a dry argon gas stream, and afterward 15 ml (LDA: 33 mmols) of an LDA solution (27 wt%, a THF/heptane solution) were added dropwise. After one hour, 10.3 ml (83 mmols) of TMSC were added, and the solution was reacted at 25° C. for 3 hours. Next, THF which was a solvent was distilled off, and 10 l of dehydrated/dried diethyl ether were added to and dissolved in the solution, and a salt which was a by-product was then removed therefrom by filtration. This diethyl ether was distilled off to obtain 660 g of a polymeric initiator which was a product (yield 99%). The structure of the product was confirmed by NMR, and the number of starting sites in the polymeric initiator was 4 on the average per molecular chain. The glass transition temperature of the product was measured by DSC, and as a result, it was $-24°$ C.

[Living polymerization of MMA]

660 g (starting sites: 33 mmols) of this polymeric initiator were dissolved in 3 l of THF, and 70 ml of an acetonitrile solution (0.18 mmol/ml) of TAS+(CH$_3$)$_3$SiF$_2^-$ were further added thereto. Next, 466 ml (440 g, 4.4 mols) of MMA were added dropwise thereto at 0° C. and reaction was performed for 2 hours. The solution was added to methanol to cause precipitation, thereby obtaining 1050 g of EA/MMA graft copolymer (backbone: PEA, branches: PMMA, PEA/PMMA=60/40) which was a product (yield 95%). The yield, total light transmittance, modulus in tension, tensile strength, elongation at break and weather resistance of the obtained graft copolymer are set forth in Table 1.

EXAMPLE 5

[Synthesis of ethylene-ethyl acrylate copolymer-based polymeric initiator]

500 g (EA: 1.1 mols) of ethylene-ethyl acrylate (EA) copolymer NUC-6570 [made by Nippon Unicar Co., Ltd., ethylene/EA=75/25, number average molecular weight Mn=161,000 (GPC)] were dissolved in a mixed solvent of 9 l of sufficiently dehydrated/purified tetralin and 1 l of THF, and then cooled to 0° C. with stirring in a dry argon gas atmosphere. Afterward, 21 ml (LDA: 44 mmols) of an LDA solution (27 wt%, a THF/heptane solution) were added dropwise. After one hour, 13 ml (110 mmols) of TMSC were added, and the solution was reacted at 25° C. for 3 hours. Next, the solution was filtered to remove a salt therefrom which was a by-product. Tetralin and THF which were solvents were then distilled off to obtain 500 g of a polymeric initiator which was a product (yield 100%). The number of starting sites in the polymeric initiator was about 10 per molecular chain. The glass transition temperature of the product was measured by DSC, and as a result, it was $-100°$ C. or less.

[Living polymerization of MMA]

500 g (starting sites: 44 mmols) of this polymeric initiator were dissolved in 3 l of tetralin, and 90 ml of an acetonitrile solution (0.18 mmol/ml) of TAS+(CH$_3$)$_3$SiF$_2^-$ were then added thereto. Afterward, 350 ml (330 g, 3.3 mols) of MMA were added dropwise thereto at 0° C. and the solution was then reacted for 2 hours. The reaction solution was added to methanol to cause precipitation, thereby obtaining 790 g of ethylene-EA/MMA graft copolymer (backbone: ethylene-EA copolymer, branches: PMMA, ethylene-EA/PMMA =60/40) which was a product (yield 95%). The yield, total light transmittance, modulus in tension, tensile strength, elongation at break and weather resistance of the obtained graft copolymer are set forth in Table 1.

COMPARATIVE EXAMPLE 1

[Synthesis of vinylphenylketenemethyltrimethylsilylacetal (VPKTSA) which is an initiator for MMA macromonomer]

12.2 g of commercially available vinylbenzyl chloride (a mixture of 60% of a meta-isomer and 40% of a para-isomer) were reacted with 5 g of NaCN in a mixed solvent of methanol/water=12.2 g/5 g at 64° C. for 12 hours. A reaction product solution was filtered, and the solvent was then distilled off, followed by distillation under reduced pressure, thereby obtaining 8.1 g of vinylbenzyl cyanide (yield 71%).

6.4 g of this vinylbenzyl cyanide were dissolved in 1.8 g of anhydrous ethanol, and the solution was allowed to absorb 2.0 g of dry hydrogen chloride with stirring at 0° C. and then allowed to stand in a refrigerator for a whole day and night. A precipitate of a produced imide ester hydrochloride was collected by filtration and then vacuum-dried (yield 70%).

6.7 g of this imide ester hydrochloride and 3.4 g of water were stirred at room temperature for 15 minutes, and the solution was concentrated and then distilled under reduced pressure, thereby obtaining 4.7 g of methyl vinylphenylacetate (yield 59%).

26.8 g of a THF solution in a 8% LDA were placed in 10 a nitrogen-replaced container. This container was ice-cooled, and 3.5 g of methyl vinylphenylacetate were added dropwise thereto over 5 minutes, followed by stirring for 30 minutes. Next, 5.4 g of TMSC were added dropwise over 5 minutes to this solution, and the temperature of the reaction mixture was then returned to room temperature. The solution was then stirred at room temperature for 30 minutes, and the reaction solution was filtered and the resultant filtrate was further concentrated. The residue was washed with anhydrous ether, and then filtered several times. Afterward, ether was distilled off, followed by distillation under reduced pressure to obtain 2.2 g of the object VPKTSA (yield 45%).

[Synthesis of MMA macromonomer by GTP process]

Under dry nitrogen atmosphere, 2.2 g (8.97 mmols) of VPKTSA, 0.03 g (0.11 mmol) of TAS+(CH$_3$)$_3$SiF$_2^-$ and 89.7 g (0.897 mol) of dry MMA were added to 100 ml of anhydrous THF, and they were polymerized at room temperature for 3 hours. The solution was added to a hexane solution containing 5% of methanol to obtain macromonomer of poly MMA having Mn=11,000 and Mw/Mn=1.10 and having a styryl group at its terminal in a yield of 90%. According to NMR, it was apparent that the introduction ratio of the styryl group was 100%.

[Synthesis of BA/MMA graft copolymer]

60 g of MMA macromonomer, 40 g of BA, 0.5 g of BPO were dissolved in 300 ml of toluene, and after sufficient nitrogen replacement, reaction was carried out at 80° C. for 3 hours. The solution was added to methanol to precipitate a polymer, and the polymer was then vacuum-dried to obtain 84 g of BA/MMA graft copolymer (BA/MMA=40/60) (yield 84%). The yield, total light transmittance, modulus in tension, tensile strength, elongation at break and weather resistance of the obtained graft copolymer are set forth in Table 1.

EXAMPLE 6

[Synthesis of polymethyl acrylate (PMA)-based polymeric initiator]

1 kg of methyl acrylate (MA), 1 kg of toluene and 1 g of BPO were mixed and dissolved, and the solution was then heated at 80° C. for 2 hours in a nitrogen gas atmosphere. Next, the reaction solution was added dropwise to 15 l of hexane to precipitate a polymer. The obtained polymer was then vacuum-dried at 80° C. for 12 hours to obtain 900 g of PMA. The number average molecular weight of this polymer was 90,000 according to GPC, and yield was 90%.

Next, 8.6 g of this PMA (MA: 0.1 mol) were dissolved in 1 l of sufficiently dehydrated/purified THF and then cooled to −75° C. with stirring in a dry argon gas stream, and afterward 47 ml (LDA: 0.1 mol) of an LDA solution (27 wt%, a THF/heptane solution) were added dropwise thereto. After one hour, 31 ml (0.25 mol) of TMSC were added, and the solution was then reacted at 25° C. for 3 hours. Next, THF which was a solvent was distilled off, and 2 l of dehydrated/dried diethyl ether were added thereto, and a salt which was a by-product was then removed therefrom by filtration. This diethyl ether was distilled off to obtain 15.5 g of a polymeric initiator which was a product (yield 98%). The structure of the product was confirmed by NMR, and the number of starting sites in the polymeric initiator was 1,050 on the average per molecular chain. The glass transition temperature of the product was measured by DSC, and as a result, it was about 10° C.

[Living polymerization of MMA]

Next, 9.2 g (starting sites: 59 mmols) of this polymeric initiator were dissolved in 1 l of THF, and 7 ml of an acetonitrile solution (0.18 mmol/ml) of TAS+(CH$_3$)$_3$SiF$_2$−. Next, 100.6 ml (95 g, 0.95 mmol) of MMA were added dropwise thereto at 0° C. and reaction was then carried out for 2 hours. The solution was added to methanol to cause precipitation, thereby obtaining 95 g of MA/MMA graft copolymer (backbone: PMA, branches: PMMA, PEA/PMMA=5/95) which was a product (yield 95%). The total light transmittance, modulus in tension, tensile strength, elongation at break, weather resistance and Dynstat impact strength of the obtained graft copolymer are set forth in Table 2.

COMPARATIVE EXAMPLE 2

As a comparative example, the total light transmittance, modulus in tension, breaking strength, elongation at break, weather resistance and Dynstat impact strength of PMMA (Acrypet VH, made by Mitsubishi Rayon Co., Ltd.) are set forth in Table 2.

TABLE 1

|  | Example 1 | Example 2 | Example 3 | Example 4 | Example 5 | Comp. Example 1 |
| --- | --- | --- | --- | --- | --- | --- |
| Yield (%) |  |  |  |  |  |  |
| Initiator | 87 | 87 | 89 | 88 | 100 | 13 |
| Copolymer | 95 | 95 | 94 | 95 | 95 | 76 |
| Total Light Transmittance (%) | 90 | 87 | 89 | 88 | 84 | 84 |
| Modulus in Tension (kg/cm$^2$) | 8000 | 2000 | 9000 | 2000 | 3000 | 7500 |
| Tensile Strength (kg/cm$^2$) | 270 | 170 | 250 | 180 | 220 | 230 |
| Elongation at Break (%) | 110 | 200 | 80 | 250 | 300 | 60 |
| Weather Resistance (%) | 96 | 95 | 95 | 95 | 94 | 95 |

TABLE 2

|  | Example 6 | Comp. Example 2 |
| --- | --- | --- |
| Total Light Transmittance (%) | 92 | 93 |
| Modulus in Tension (kg/cm$^2$) | 30000 | 33000 |
| Tensile Strength (kg/cm$^2$) | 770 | 740 |
| Elongation at Break (%) | 6 | 5 |
| Weather Resistance (%) | 99 | 99 |
| Dynstat Impact Strength kg · cm/cm$^2$ | 12 | 6 |

As is apparent from the foregoing, the graft copolymer of the present invention retains the excellent transparency and weather resistance of an acrylic resin and is excellent in physical properties such as elongation and impact strength. In addition, as understood from the abovementioned results, the copolymer has characteristics of an elastomer.

According to a method for preparing a graft copolymer of the present invention, components of a polymeric compound constituting the backbone and a (meth)acrylic ester constituting the branch portions of the graft copolymer can be selected in a wide range, and a (meth)acrylic graft copolymer can be prepared in a high yield in which the chain length of the backbone and the branch portions is controlled.

Furthermore, the method for preparing the graft copolymer of the present invention permits easily obtaining highly functional and high-performance resins such as the (meth)acrylic resins having excellent transparency, weather resistance and physical properties and the (meth)acrylic resins having characteristics of an elastomer. Moreover, it also permits manufacturing the various kinds of graft copolymers having a regulated structure in compliance with a use. In consequence, it is fair to say that the method of the present invention is extremely excellent.

What is claimed is:

1. A method for preparing a graft copolymer comprising the step of carrying out a living polymerization of at least one (meth)acrylic ester constituting the branch portions of the graft copolymer, by the use of a polymeric compound initiator of a polyacrylic ester having a glass transition temperature of 0° C. or less, methacrylic ester-acrylic ester copolymer or ethylene-acrylic ester copolymer having a number average molecular weight from 1,000 to 1,000,000 and having incorporated therein one or more initiators having the following formula (I) substantially in the absence of water and in the presence of a Lewis acid or a donor compound of an anion selected from the group consisting of $HF_2^-$, $(CH_3)_3SiF_2^-$ and $F^-$:

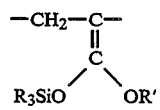

wherein R is hydrogen or an alkyl group having 1 to 6 carbon atoms, and R' is an alkyl group having 1 to 12 carbon atoms, and the living polymerization is carried out at a temperature from −100° to 100° C. and wherein said polymeric compound initiator constitutes the backbone of the graft copolymer.

2. The method for preparing a graft copolymer according to claim 1 wherein the polymeric compound has two or more units represented by the formula (I) in the molecular chain.

3. The method for preparing a graft copolymer according to claim 1 wherein R in the formula (I) is a methyl group, and R' is an alkyl group having 1 to 4 carbon atoms.

4. The method for preparing a graft copolymer according to claim 1 wherein the Lewis acid is one selected from the group consisting of zinc halides, mono- and dialkylaluminum halides and dialkylaluminum oxides.

5. The method for preparing a graft copolymer according to claim 1 wherein the Lewis acid is present in an amount of from 5 to 20 mol% with respect to the (meth)acrylic ester to be fed to the living polymerization system.

6. The method for preparing a graft copolymer according to claim 1 wherein the donor compound of an anion is one selected from the group consisting of $TAS^+HF_2^-$, $TAS^+(CH_3)_3SiF_2^-$ and $(C_4H_9)_4N^+F^-$.

7. The method for preparing a graft copolymer according to claim 1 wherein the donor compound of an anion is present in an amount of from 0.1 to 50 mol% with respect to the units represented by the formula (I).

8. The method for preparing a graft copolymer according to claim 1 wherein the living polymerization is carried out in a solvent.

9. The method for preparing a graft copolymer according to claim 1 wherein the living polymerization is carried out at a temperature of from −80° C. to 60° C.

10. The method for preparing a graft copolymer according to claim 1 wherein the (meth)acrylic ester is such one that a polymer obtained therefrom has a glass transition temperature of 40° C. or more.

* * * * *